(12) United States Patent
Sugimoto et al.

(10) Patent No.: US 11,531,811 B2
(45) Date of Patent: Dec. 20, 2022

(54) METHOD AND SYSTEM FOR EXTRACTING KEYWORDS FROM TEXT

(71) Applicant: Hitachi, Ltd., Tokyo (JP)

(72) Inventors: Ken Sugimoto, Sunnyvale, CA (US); Kazuhide Aikoh, Santa Clara, CA (US); Shouchun Peng, San Jose, CA (US); Jose Luis Beltran-Guerrero, Mountain View, CA (US)

(73) Assignee: Hitachi, Ltd., Tokyo (JP)

( * ) Notice: Subject to any disclaimer, the term of this patent is extended or adjusted under 35 U.S.C. 154(b) by 124 days.

(21) Appl. No.: 16/937,093

(22) Filed: Jul. 23, 2020

(65) Prior Publication Data

US 2022/0027558 A1    Jan. 27, 2022

(51) Int. Cl.
*G06F 40/279* (2020.01)
*G06F 40/253* (2020.01)
*G06F 40/242* (2020.01)

(52) U.S. Cl.
CPC .......... *G06F 40/279* (2020.01); *G06F 40/242* (2020.01); *G06F 40/253* (2020.01)

(58) Field of Classification Search
None
See application file for complete search history.

(56) References Cited

U.S. PATENT DOCUMENTS

| | | | |
|---|---|---|---|
| 5,181,163 A * | 1/1993 | Nakajima | G06F 40/242 704/10 |
| 5,870,702 A * | 2/1999 | Yamabana | G06F 40/53 715/239 |
| 8,443,008 B2 | 5/2013 | Tsuchida et al. | |
| 10,042,923 B2 * | 8/2018 | Markman | G06F 16/35 |
| 2011/0055228 A1 * | 3/2011 | Tsuchida | G06F 40/242 707/750 |
| 2014/0163953 A1 * | 6/2014 | Parikh | G06F 40/274 704/9 |
| 2015/0248440 A1 * | 9/2015 | Takayama | G06F 16/285 707/737 |
| 2018/0341839 A1 * | 11/2018 | Malak | G06V 30/2272 |
| 2019/0155802 A1 * | 5/2019 | Miller | G06F 16/235 |
| 2020/0110780 A1 * | 4/2020 | Tamura | G06F 40/284 |
| 2020/0193380 A1 * | 6/2020 | Muthuswamy Sivaraman | G06N 3/0427 |
| 2021/0073466 A1 * | 3/2021 | Sorah | G06F 40/30 |
| 2021/0103699 A1 * | 4/2021 | Takeuchi | G06K 9/6256 |

* cited by examiner

*Primary Examiner* — Douglas Godbold
(74) *Attorney, Agent, or Firm* — Procopio, Cory, Hargreaves & Savitch LLP

(57) ABSTRACT

Example implementations described herein involve extracting keywords and dependency information from a text; and generating a co-occurrence dictionary for the text, the generating the co-occurrence dictionary involving selecting ones of the keywords for inclusion in the co-occurrence dictionary based on a number of times the ones of the keywords satisfy the dependency rules; determining for the selected ones of the keywords included in the co-occurrence dictionary, surrounding words to be associated with the selected ones of the keywords in the co-occurrence dictionary based on a number of instances of co-occurrence of the surrounding words with the selected ones of the keywords; and generating weights for each of the selected ones of the keywords in the co-occurrence dictionary based on a number of the surrounding words associated with the selected ones of the keywords.

12 Claims, 20 Drawing Sheets

Dependency information

| Keywords | Dependency between each word |
|---|---|
| Please verify the location of the well | root(ROOT-0, please-1)<br>comp(please-1, verify-2)<br>dobj(verify-1, location-4)<br>det(location-4, the-3)<br>nmod(location-4, well-7)<br>case(well-7, of-5)<br>det(well-7, the-6) |
| ... | |

Labeling information

| Keywords | Labeling |
|---|---|
| Please verify the location of the well | (VB, VB, DT, NN, IN, DT, NN) |
| ... | |

FIG. 5

104-1 Co-occurrence dictionary 104-2

| Keywords | Co-occurrence words |
|---|---|
| rule | Production, location |
| name | Verify, lease |

Co-occurrence words matrix 106-1 106-2

| text | keywords | Co-occurrence words | |
|---|---|---|---|
| | | Production | location |
| You cannot have production without exception for the location | exception | 1 | 1 |
| | location | 1/2 | 0 |
| ... | | | |

Weights of co-occurrence words

| Weights of co-occurrence words | |
|---|---|
| Production | location |
| 0.3 | 0.7 |

Confidence of keyword

| text | keywords | confidence |
|---|---|---|
| You cannot have production without exception for the location | exception | 1 |
| | location | 0.15 |
| ... | | |

FIG. 10

METHOD AND SYSTEM FOR EXTRACTING KEYWORDS FROM TEXT

BACKGROUND

Field

The present disclosure is generally directed to text extraction systems, and more specifically, to systems and methods for extracting keywords from text.

Related Art

Topic extraction involves techniques for extracting keywords which describe the main theme in the text. For example, such techniques extract the word "location" as a keyword from the text "Please verify the location of the well" as output because the word "location" describes this text. There are many applications utilizing such discovered keywords. For example, topic extraction can be used to classify texts, to summarize articles, and so on.

Topic extraction techniques typically utilize statistics and/or words co-occurrence of the text. In an example related art implementation, there is a method of extracting keywords by filtering out some frequent words depending on rules. Such related art methods extract n-grams as candidates of keywords and if some frequent words in the document corpus appeared in the pre-defined position, the filter filters out candidates.

In another related art topic extraction technique, there is a method of creating a co-occurrence dictionary from dependency information. This related art method calculates statistics of co-occurrence assuming that dependent words are co-occurrence words, and creates a co-occurrence dictionary. Such related art implementations extract keywords as nouns which are in the co-occurrence dictionary and at the top or at the bottom on the dependency tree because these words are assumed to be important words.

SUMMARY

Related art implementations do not take context into consideration, which result in many non-keywords being extracted as keywords. For example, related art implementations extract words as keywords which frequently appear in one document but do not appear in other documents. So, it can extract "location" as a keyword from the text, "Please verify the location of the well", if "location" appears frequently in one document. However, such related art implementations may also extract "production", "exception" and "location" as keywords from the text, "You cannot have production without exception for the location", even though only "exception" should be the keyword in this text. The related art implementations will assume that "production" and "location" are keywords when these words do not appear frequently in the document corpus, and the "location" is always thought of as a keyword even in situations when it is not true.

In another problem in the related art, related art implementations cannot extract keywords in the middle of the dependency tree. For example, the related art implementations can extract "production" and "location" from the text, "You cannot have production without exception for the location" because those words are the nouns at the top or at the bottom of the dependency tree, when those two words are in the co-occurrence dictionary. Thus, such related art implementations cannot extract "exception" as a keyword which occurs in the middle of the dependency tree.

People can know which words are keywords and which words are not keywords by reading the words appearing around the keywords. So, if words are extracted which appear frequently around the keywords, some words which are categorized as keywords can thereby be excluded. In the present disclosure, such words are referred to herein as surrounding words. Example implementations can further evaluate the confidence of keywords for each word by determining how many surrounding words are appeared around the keywords.

Through the example implementations described herein, a system can be implemented to evaluate the confidence of each keyword in the text. Users can use these confidences directly and/or can set the threshold to extract keywords in accordance with the desired implementation.

Aspects of the present disclosure can involve a method, which can include extracting keywords and dependency information from a text; and generating a co-occurrence dictionary for the text, the generating the co-occurrence dictionary involving selecting ones of the keywords for inclusion in the co-occurrence dictionary based on a number of times the ones of the keywords satisfy the dependency rules; determining for the selected ones of the keywords included in the co-occurrence dictionary, surrounding words to be associated with the selected ones of the keywords in the co-occurrence dictionary based on a number of instances of co-occurrence of the surrounding words with the selected ones of the keywords; and generating weights for each of the selected ones of the keywords in the co-occurrence dictionary based on a number of the surrounding words associated with the selected ones of the keywords.

Aspects of the present disclosure can involve a computer program, which can include instructions involving extracting keywords and dependency information from a text; and generating a co-occurrence dictionary for the text, the generating the co-occurrence dictionary involving selecting ones of the keywords for inclusion in the co-occurrence dictionary based on a number of times the ones of the keywords satisfy the dependency rules; determining for the selected ones of the keywords included in the co-occurrence dictionary, surrounding words to be associated with the selected ones of the keywords in the co-occurrence dictionary based on a number of instances of co-occurrence of the surrounding words with the selected ones of the keywords; and generating weights for each of the selected ones of the keywords in the co-occurrence dictionary based on a number of the surrounding words associated with the selected ones of the keywords. The instructions may be stored in a non-transitory computer readable medium and executed by one or more processors.

Aspects of the present disclosure can involve an apparatus, which can involve a processor, configured to extract keywords and dependency information from a text; and generate a co-occurrence dictionary for the text, by selecting ones of the keywords for inclusion in the co-occurrence dictionary based on a number of times the ones of the keywords satisfy the dependency rules; determining for the selected ones of the keywords included in the co-occurrence dictionary, surrounding words to be associated with the selected ones of the keywords in the co-occurrence dictionary based on a number of instances of co-occurrence of the surrounding words with the selected ones of the keywords; and generating weights for each of the selected ones of the keywords in the co-occurrence dictionary based on a number of the surrounding words associated with the selected ones of the keywords.

Aspects of the present disclosure can involve a system, which can include means for extracting keywords and dependency information from a text; and means for generating a co-occurrence dictionary for the text, the generating the co-occurrence dictionary involving means for selecting ones of the keywords for inclusion in the co-occurrence dictionary based on a number of times the ones of the keywords satisfy the dependency rules; means for determining for the selected ones of the keywords included in the co-occurrence dictionary, surrounding words to be associated with the selected ones of the keywords in the co-occurrence dictionary based on a number of instances of co-occurrence of the surrounding words with the selected ones of the keywords; and means for generating weights for each of the selected ones of the keywords in the co-occurrence dictionary based on a number of the surrounding words associated with the selected ones of the keywords.

BRIEF DESCRIPTION OF DRAWINGS

FIG. 4 illustrates dependency information, in accordance with an example implementation.

FIG. 5 illustrates labeling information, in accordance with an example implementation.

FIG. 7 illustrates an example of a co-occurrence words dictionary, in accordance with an example implementation.

FIG. 8 illustrates an example of a co-occurrence words matrix, in accordance with an example implementation.

FIG. 9 illustrates the example weights of the co-occurrence words in accordance with an example implementation.

FIG. 10 illustrates an example of the keyword confidence, in accordance with an example implementation.

DETAILED DESCRIPTION

Figure 1:
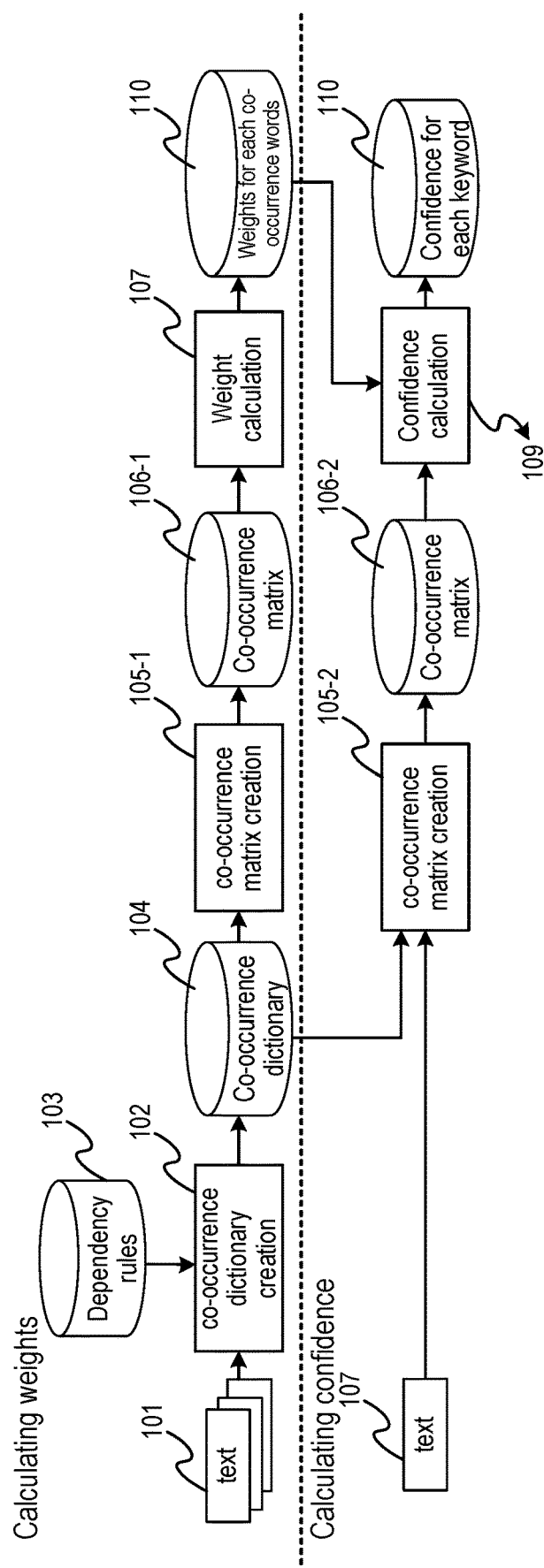
FIG. 1 illustrates an example system overview in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example system overview in accordance with an example implementation. In the example of FIG. 1, there are two aspects to the system. In a first aspect, there is the calculation of weights as illustrated in the top portion of FIG. 1. In a second aspect, there is the calculation of the confidence for each keyword as illustrated in the bottom portion of FIG. 1.

In the first aspect involving the calculation of weights, the input texts are collected at 101. Given the input texts 101, the co-occurrence dictionary creation module 102 creates a co-occurrence dictionary 104 from the texts 101 by using dependency rules 103. The co-occurrence matrix creation module 105-1 creates a co-occurrence matrix 106-1 from the co-occurrence dictionary 104. The weights calculation module 107 calculates weights for each co-occurrence words 108 from co-occurrence matrix 106-1.

In the second aspect involving the confidence calculation, the system infers the confidence of keywords for each word. Text 107 that users are providing to the system for the keyword extractions are provided to the system. The co-occurrence matrix creation module 105-2 creates a co-occurrence matrix 106-2 from the co-occurrence dictionary 104, which is created in the first aspect of the system involving the calculation of weights. Co-occurrence matrix creation module 105-1 and 105-2 execute the same functions. Co-occurrence matrix 106-1 and 106-2 also execute the same functions, though the input data is different for each aspect of the system because the input texts are different.

The confidence calculation module 109 calculates the confidence for each keyword 110 from co-occurrence matrix 106-2 and the weights for each co-occurrence words 108.

Figure 2:
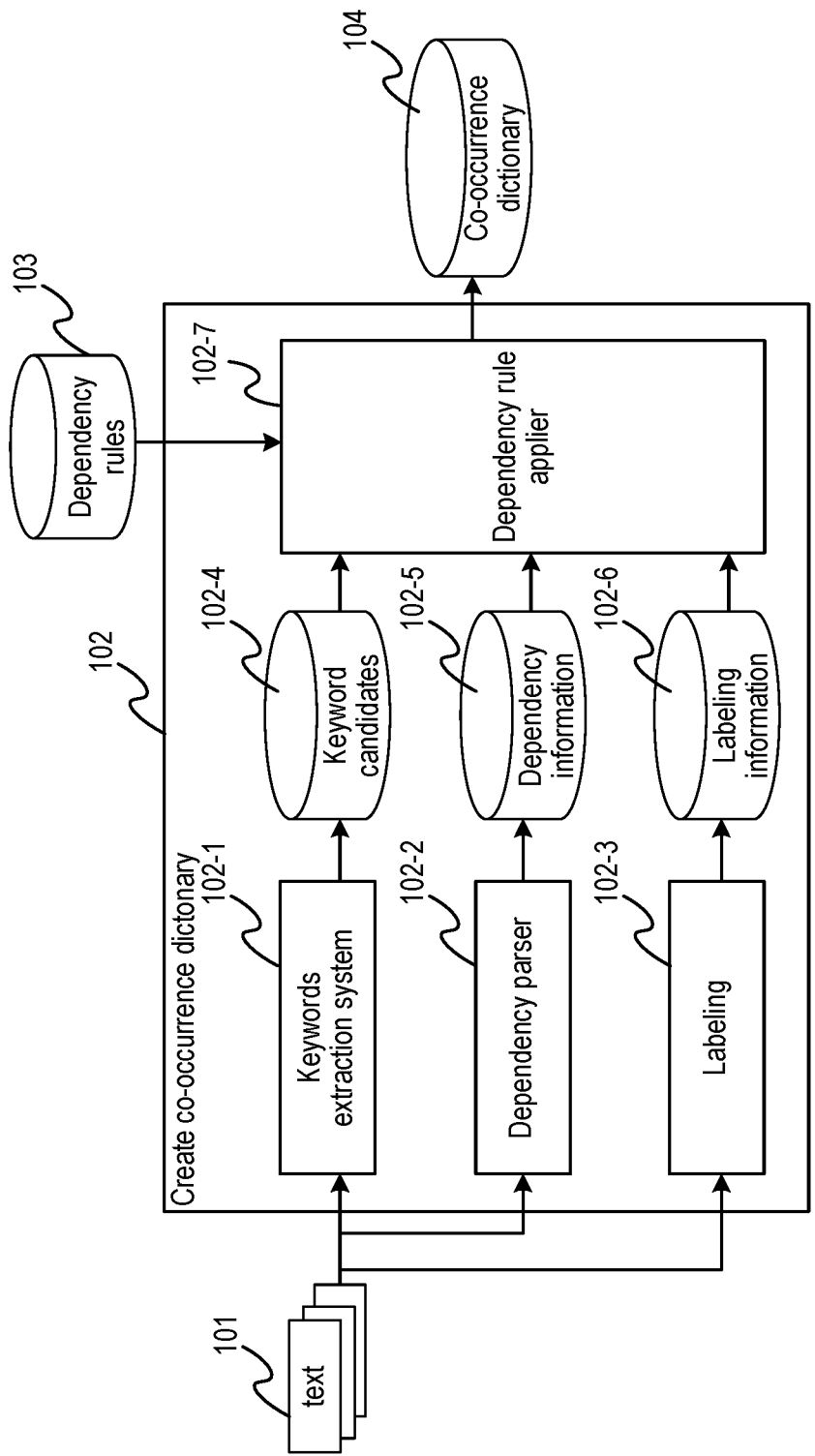
FIG. 2 illustrates an example of the co-occurrence dictionary creation module, in accordance with an example implementation.

FIG. 2 illustrates an example of the co-occurrence dictionary creation module 102, in accordance with an example implementation. In the example implementation of FIG. 2, the text 101 is processed by three modules: keywords extraction system 102-1, dependency parser 102-2 and labeling 102-3. The keyword extraction system 102-1 extracts keyword candidates from all texts. The result may include words which are not actually keywords for all texts. The keyword extraction system 102-1 can be any type of system such as tf-idf, topic modeling or as known to a person of ordinary skill in the art in accordance with the desired implementation. The result is the keyword candidates 102-4.

Dependency parser 102-2 extracts dependency information from texts. The dependency parser 102-2 can be implemented from any dependency parser system as known to a person of ordinary skill in the art, such as CoreNLP, SpaCY, or others in accordance with the desired implementation. The result is dependency information 102-5.

Labeling 102-3 adds a label to each word. Labeling can be POS (Part-of-Speech) tags and can be implemented through any POS tag labeling tool known to a person of ordinary skill in the art in accordance with the desired implementation. The result is labeling information 102-6.

Dependency rule applier 102-7 creates co-occurrence dictionary 104 by using dependency rules 103 from keyword candidates 102-4, dependency information 102-5 and labeling information 102-6.

Figure 3:
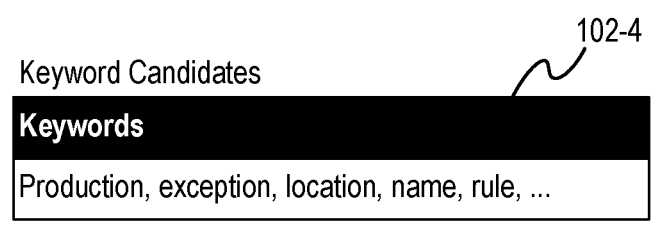
FIG. 3 illustrates an example of keyword candidates, in accordance with an example implementation.

FIG. 3 illustrates an example of keyword candidates, in accordance with an example implementation. Keyword candidates 102-4 include a list of words as keywords.

FIG. 4 illustrates dependency information 102-5, in accordance with an example implementation. The dependency information includes text 102-5-1 and dependency between each word 102-5-2. Text 102-5-1 includes each text from text 101. Dependency between each word 102-5-2 includes dependency information between two words in the text 102-5-1.

The format of 102-5-2 is "dependency_tag (parent_word-number, child_word-number)". Depending on the desired implementation, the dependency_tag can be in a Stanford typed dependencies representation. This tag represents the type of dependency between two words. Parent_word and child-word are words in the text and parent_word modifies the child_word. "-number" indicates the order of the word in the text 102-5-1.

FIG. 5 illustrates labeling information 102-6, in accordance with an example implementation. This table includes text 102-6-1 and labeling of text 102-6-2. Text 102-6-2 is each text in text 101. Labeling of text 102-6-2 involves a list of labels for each word in the text. Labels can involve POS (part-of-speech) tags or NER (named entity recognition) tags, or otherwise depending on the desired implementation.

Figure 6:
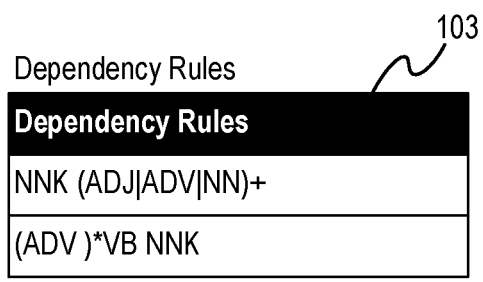
FIG. 6 illustrates dependency rules, in accordance with an example implementation.

FIG. 6 illustrates dependency rules 103, in accordance with an example implementation. Dependency rules 103 are rules to extract keywords and surrounding words from text. These rules are developed by human resources, or otherwise in accordance with the desired implementation. Depending on the desired implementation, the dependency rules 103 can be regular expression of labels with identification of keywords, such as NN (Noun), ADJ (adjective), ADV (Adverb) as shown in FIG. 5, and the "K" after label identifies keywords. The system searches dependency information of the text which fits the dependency rules. Details of the searching of dependency information are described with respect to FIG. 11.

FIG. 7 illustrates an example of a co-occurrence words dictionary, in accordance with an example implementation. The co-occurrence words dictionary includes keywords 104-1 and co-occurrence words 104-2. Co-occurrence words 104-2 are the words which appear frequently around the keywords 104-1 of the text.

FIG. 8 illustrates an example of a co-occurrence words matrix 106, in accordance with an example implementation. The co-occurrence words matrix 106 can involve text 106-1, keywords 106-2 and co-occurrence words 106-3. Depending on the desired implementation, there can be multiple co-occurrence words matrices 106 (e.g., one co-occurrence words matrix 106 per row of co-occurrence dictionary 104).

FIG. 9 illustrates the example weights of the co-occurrence words 108 in accordance with an example implementation. Specifically, there can be multiple instances of the weights of co-occurrence words 108. For example, there can be one instance of weights of co-occurrence words 108 per row of co-occurrence dictionary 104. Each column includes a co-occurrence word and a weight of each word.

FIG. 10 illustrates an example of the keyword confidence 110, in accordance with an example implementation. Specifically, this table include text 110-1, keywords 110-2 and confidence 110-3. Text 110-1 is each text in 101. Keywords 110-2 are keywords extracted from text 101. Confidence 110-3 is the calculated confidence of each of the keywords 110-2.

Figure 11:
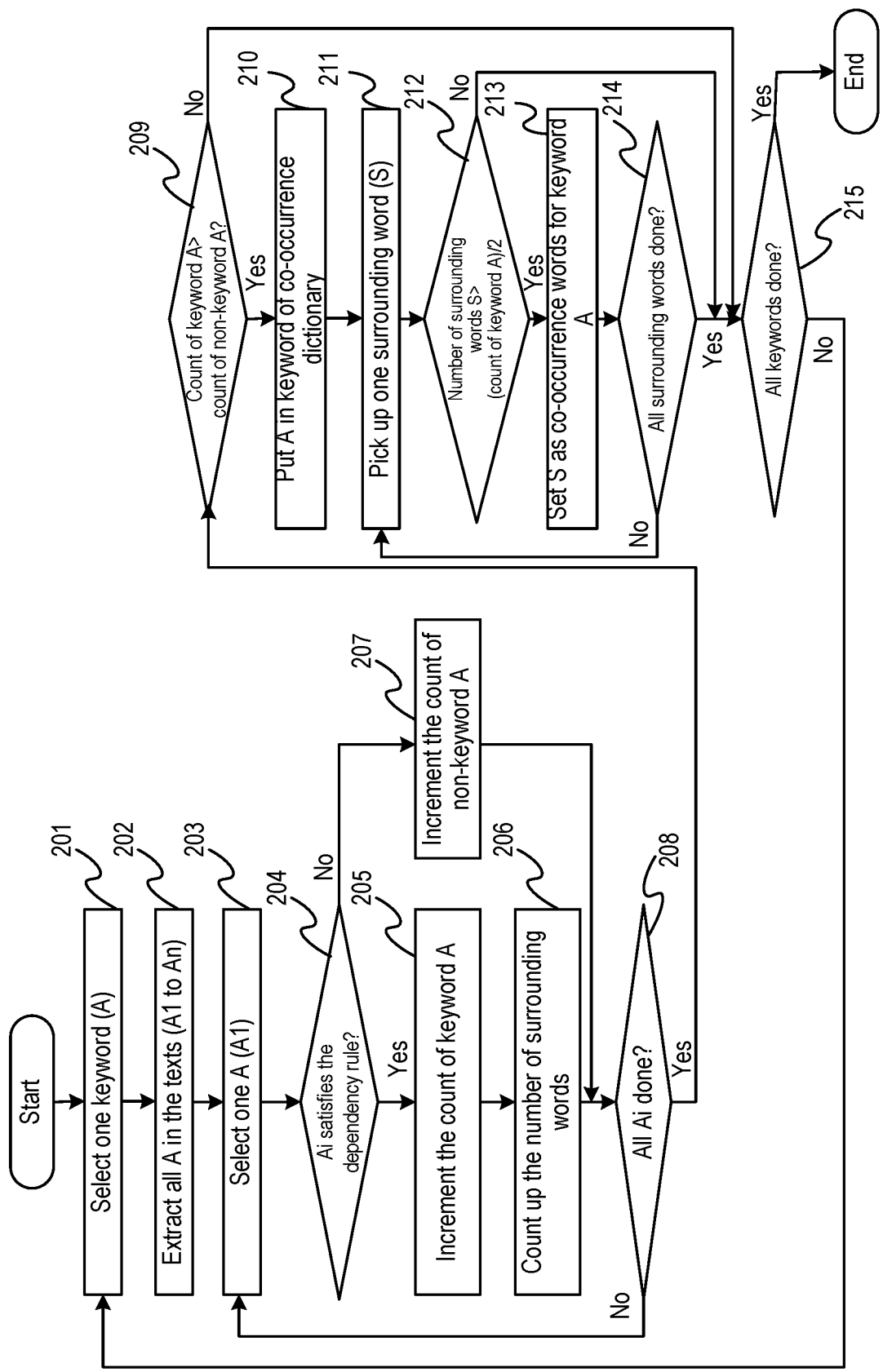
FIG. 11 illustrates an example flow of the dependency rule applier, in accordance with an example implementation.

FIG. 11 illustrates an example flow of the dependency rule applier, in accordance with an example implementation. At 201, the flow selects one keyword A from the keyword candidates 102-4. As an example, assume the keyword "location" was extracted.

At 202, the flow extracts all instances of A from text 101, which are denoted as A1 to An. As an example, the flow extracts n instances of "location" which are A1 to An from the text 101.

At 203, an iterative loop is initiated to select and parse each keyword Ai for i=1 to n. As an example, suppose Ai instance of "location" is from the text "please verify the location of the well".

At 204, the flow checks to determine if keyword Ai satisfies the dependency rule (204). This can be done as follows. First, the flow selects the text which includes the keyword Ai. Next, from dependency information 102-5 of the text, dependency paths are created. Dependency paths are all paths which follow the parents to the children in the text. For example, three dependency paths are created from the text "please verify the location of the well", which includes "Please verify location the", "please verify location well of", "please verify location well the". Then, the flow replaces each word in the dependency path with a label from 102-6. In this step, for the keyword Ai, "K" is added at the end of the label. For example, "please verify location the" are converted into "VB VB NNK DT", "please verify location well of" is converted into "VB VB NNK NN IN", and "please verify location well the" are converted into "VB VB NNK NN DT". Finally, the flow checks if the label satisfies the dependency rule which involve the regex pattern of the labels. For example, there are two dependency rules, those are "NNK (ADJ|ADV|NN)+" and "(ADV)*VB NNK". "VB VB NNK" that is "please verify location" matches "(ADV)*VB NNK", and "NNK NN" that is "location well" matches "NNK (ADJ|ADV|NN)+". If some dependency path matches the dependency rule, a count is incremented for keyword A at 205. If the dependency paths do not match the dependency rule, a count is incremented for non-keyword A at 207.

At 206, the flow extracts the words surrounding keyword A and increments a counter for each word determined to be a surrounding word. In this example, for "please verify location", "please" and "verify" appear around "location", so the count of "please" and "verify" are incremented. Also, for "location well", the count of "well" is incremented.

At 208, a check is determined as to whether all Ai from i=1 to n are processed. If not, then the flow reiterates at 204-207 with the next Ai. If all Ai are processed, the flow checks if the count of keyword A is larger than the count of non-keyword A at 209. If it is larger (Yes), then the counter indicates that word A should be a keyword and proceeds to 210 to include A in the keywords column of co-occurrence dictionary 104-1. At 211, the flow obtains all of the surrounding words S and their corresponding counts calculated from the flow at 206.

At 212, if the count of surrounding word S is larger than the count of (keyword-A)/10 (Yes), the flow proceeds to 213 and sets S as a co-occurrence word of keyword A. This means S is set in co-occurrence words 104-2 in the co-occurrence dictionary 104. If not (No), the flow proceeds to 214. Though the count threshold is set at (keyword-A)/10, other similar formulas can be used instead in accordance with the desired implementation.

At 214, the loop is iterated to 212 until all surrounding words S is processed. Once all surrounding words S are processed, the co-occurrence words for A are thereby obtained. At 215 the loop is iterated to 201 until all keywords A from the keyword candidates 102-4 are processed. Once all keyword candidates 102-4 are processed, the co-occurrence dictionary 104 is thereby created.

Figure 12:
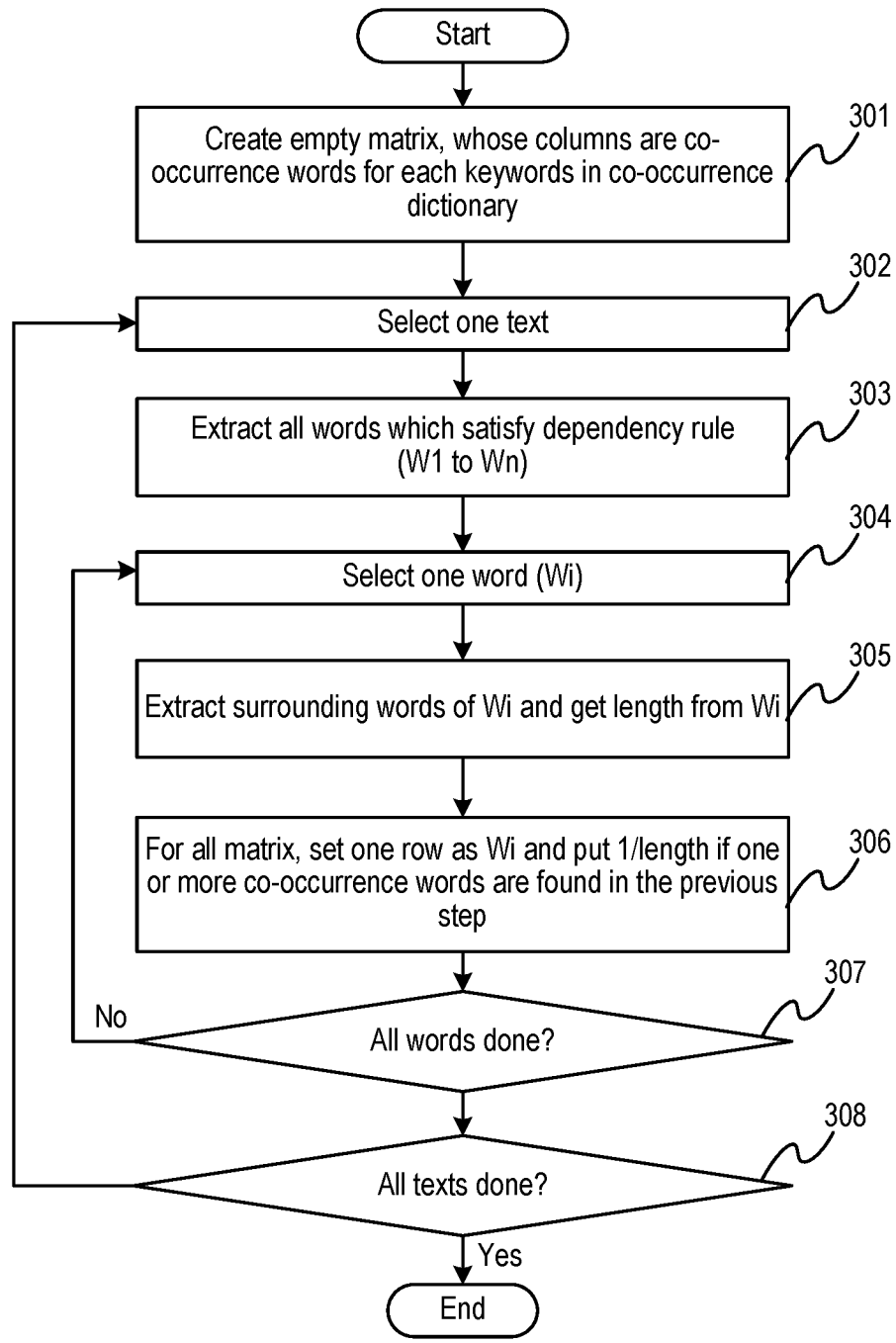
FIG. 12 illustrates an example flow for creating the co-occurrence words matrix, in accordance with an example implementation.

FIG. 12 illustrates an example flow for creating the co-occurrence words matrix 106, in accordance with an example implementation. At 301, the flow creates multiple empty matrices, with one matrix per keyword in co-occurrence dictionary 104. Co-occurrence words column 106-3 of each co-occurrence words matrix are co-occurrence words for each keyword in co-occurrence dictionary 104.

At 302, a text is selected and added in text column 106-1 for all matrices. At 303, words are selected from the text to determine each word that satisfies the dependency rule. For 303, the flow extracts n words, W1 to Wn. W1 to Wn are set in column 106-2 for the text. The flow determines whether a word satisfies the rule in the same manner as the flow at 204. At 304, a word Wi is selected to parse each word Wi from i=1 to n.

At 305, the flow extracts surrounding words of Wi to determine whether co-occurrence words 106-3 appeared. Surrounding words indicates words which are extracted when applying dependency rules, in the same manner as that of 204. If co-occurrence words have appeared, the flow calculates the length between Wi and the co-occurrence word. Length means the number of words in the dependency tree between Wi and co-occurrence words. Minimum length is set to 1.

If co-occurrence words have appeared, the corresponding cell is filled as 1/length. If some cells are not filled, the cell is filled as 0. This is done for all matrix entries at 306. At 307, the next Wi is processed by reiterating the loop at 303 to 306 until all Wi from i=1 to n are processed. Once all the words Wi are processed, then the next text is selected at 308 and the flow reiterates from 302 to 307 until all text is parsed.

Figure 13:
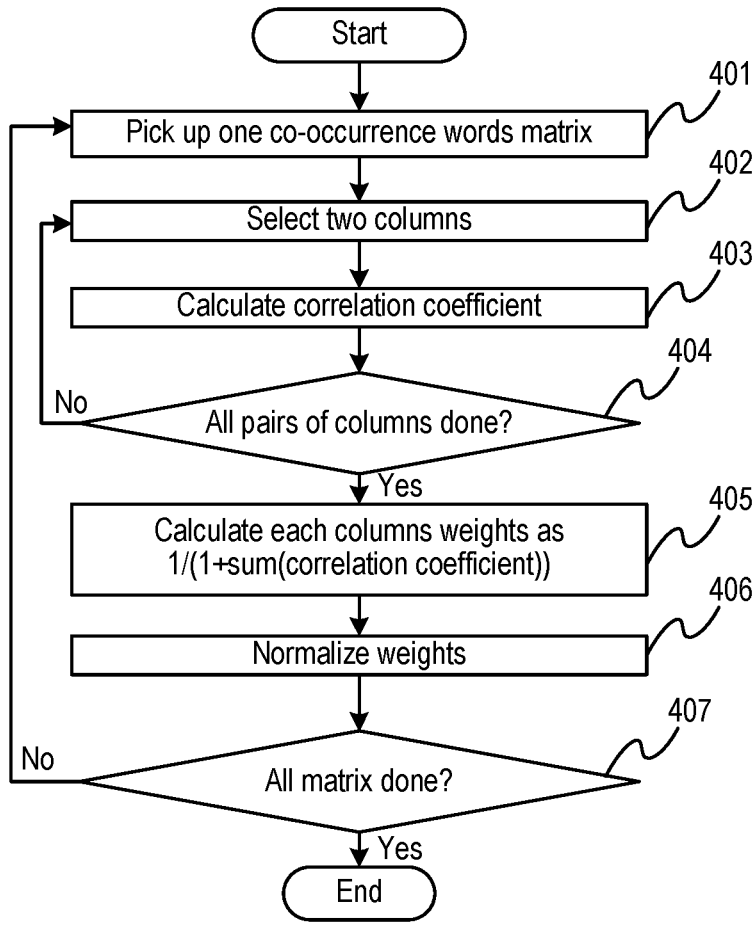
FIG. 13 illustrates an example flow for calculating the weights of each of the co-occurrence words, in accordance with an example implementation.

FIG. 13 illustrates an example flow for calculating the weights of each of the co-occurrence words, in accordance with an example implementation. This process is done for each co-occurrence matrix 106. These weights are used to calculate the confidence at 109. When calculating the confidence, the value of 1 can be used as the weight for all co-occurrence words. However, if there is some correlation between co-occurrence words, the weights of the co-occurrence words should be smaller to exclude the effect of co-occurrence between co-occurrence words.

At 401, one co-occurrence words matrix is selected for processing. At 402, for the selected co-occurrence words matrix, the flow selects two columns in the selected co-occurrence words matrix. At 403, the correlation coefficient is calculated between the two columns. At 404, the loop from 402 is continued until all pairs of columns in the co-occurrence words matrix are processed. That is, the flow iterates with all pairs of columns for calculating the coefficient until all pairs have a coefficient.

At 405, the flow calculates weights for each co-occurrence word. An example formula for the weights can include 1/1+sum(correlation coefficient for the co-occurrence word), however, other similar formulas can be utilized depending on the desired implementation.

At 406, the flow normalizes all of the calculated weights through ensuring that the sum of the weights for all of the co-occurrence words is 1. At 407, the flow is reiterated at 401 with the next co-occurrence matrix until all matrices are processed.

Figure 14:
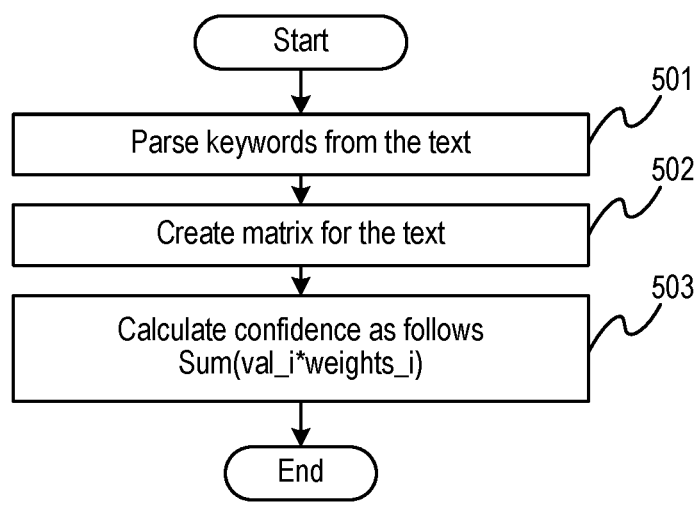
FIG. 14 illustrates an example flow to calculate the confidence for each keyword, in accordance with an example implementation.

FIG. 14 illustrates an example flow to calculate the confidence for each keyword, in accordance with an example implementation. The flow of FIG. 14 is for the text that the users desires to process for keyword extraction.

At 501, the keywords are parsed from the text. At 502, the flow creates the co-occurrence words matrix for the text by applying keywords extraction system 102-1, dependency parser 102-2 and labeling 102-3 to the text to generate keyword candidates 102-4, dependency information 102-5, and labeling information 102-6. Then, the flow determines create co-occurrence the same way through using co-occurrence matrix creation module 105-1, 105-2 by using keyword candidates 102-4, dependency information 102-5, labeling information 102-6, and co-occurrence dictionary 104.

At 503, the flow calculates the confidence. In an example implementation, the formula to calculate the confidence can be sum(val_i*weights_i), wherein val_i indicates the cell value of the number i co-occurrence words and weights is the weighs of the number i co-occurrence words. Other formulas can similarly be used in accordance with the desired implementation.

In example implementations of the system of FIG. 2 and the flow of FIG. 11, the input to the system involves dependency rules 103 which are preset by the user in accordance with the desired implementation. To determine the dependency rules, the candidates of keywords 102-4, dependency information 102-5, and label information 102-6 are utilized by the user to set the dependency rules. The resulting output of the system involves the co-occurrence dictionary 104

Figure 15:
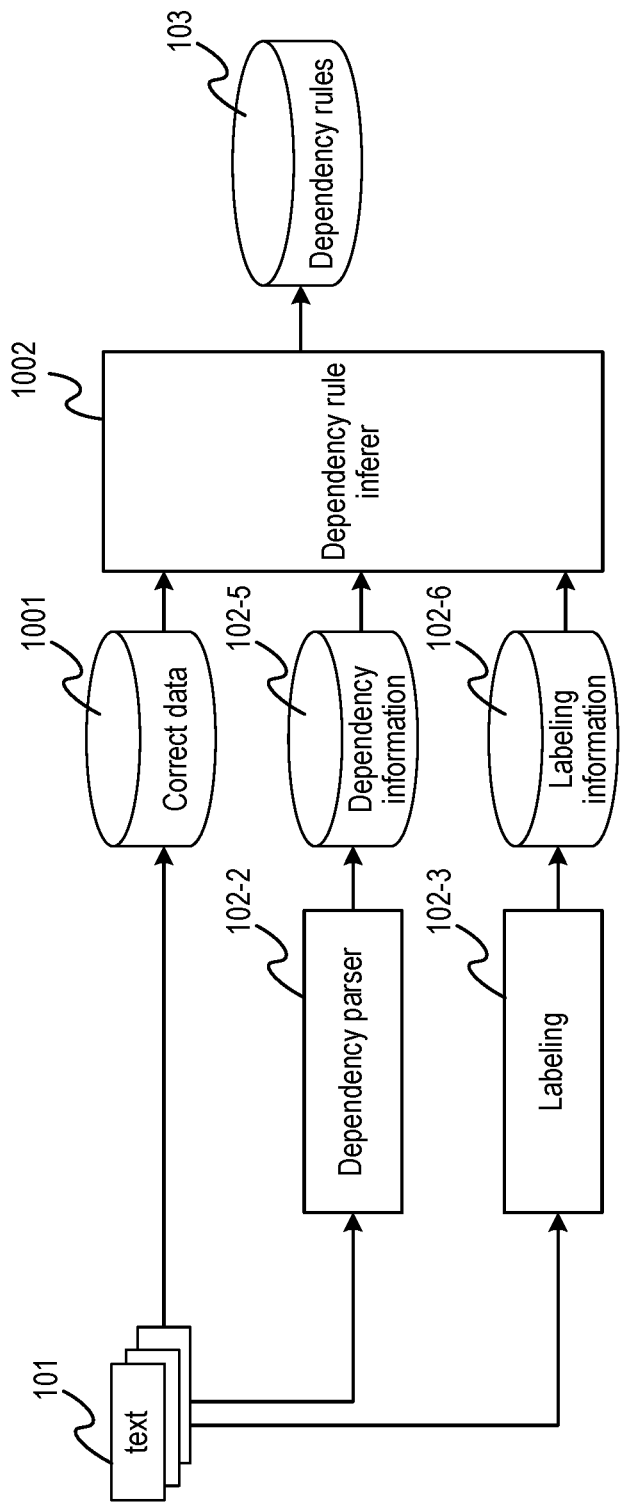
FIG. 15 illustrates an example overall system to create dependency rules, in accordance with an example implementation.

In another example implementation, the system creates the dependency rule from correct data preset and defined by the user. FIG. 15 illustrates an example overall system to create dependency rules, in accordance with an example implementation. This system creates dependency rules 103 from input texts 101. The user provides correct data 1001 as input data. Correct data 1001 includes information regarding which words are keywords and which words are surrounding words in the text as determined by the user. The dependency parser 102-2, dependency information 102-5, labeling 102-3 and labeling information 102-6 are the same as illustrated in FIG. 2. Dependency rule inferrer 1002 creates dependency rules 103 from correct data 1001, dependency information 102-5, and labeling information 102-6.

Figure 16:
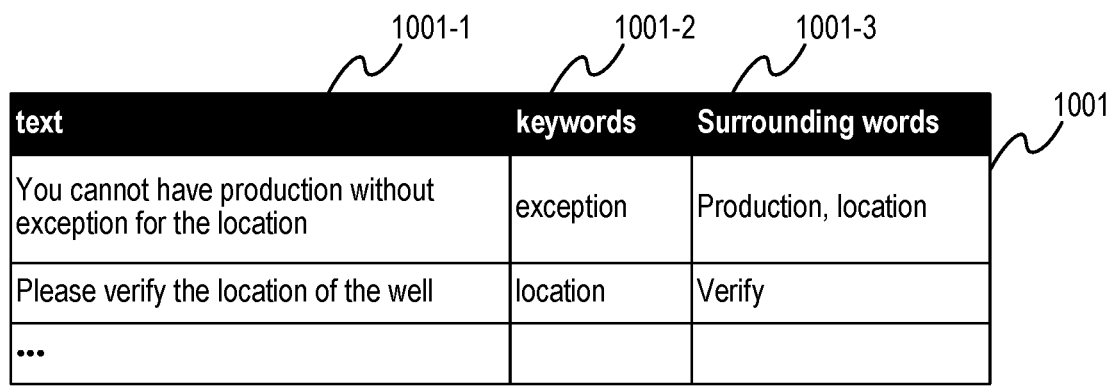
FIG. 16 illustrates an example input of correct data, in accordance with an example implementation.

FIG. 16 illustrates an example input of correct data 1001, in accordance with an example implementation. Correct data 1001 includes text 1001-1, keywords 1001-2 and surrounding words 1001-3. Keywords 1001-2 indicate the keywords in the text 1001-1 and surrounding words 1001-3 indicate surrounding words in the text 1001-1. This input is created by the user as determined by the user and is presumed to have high accuracy.

Figure 17:
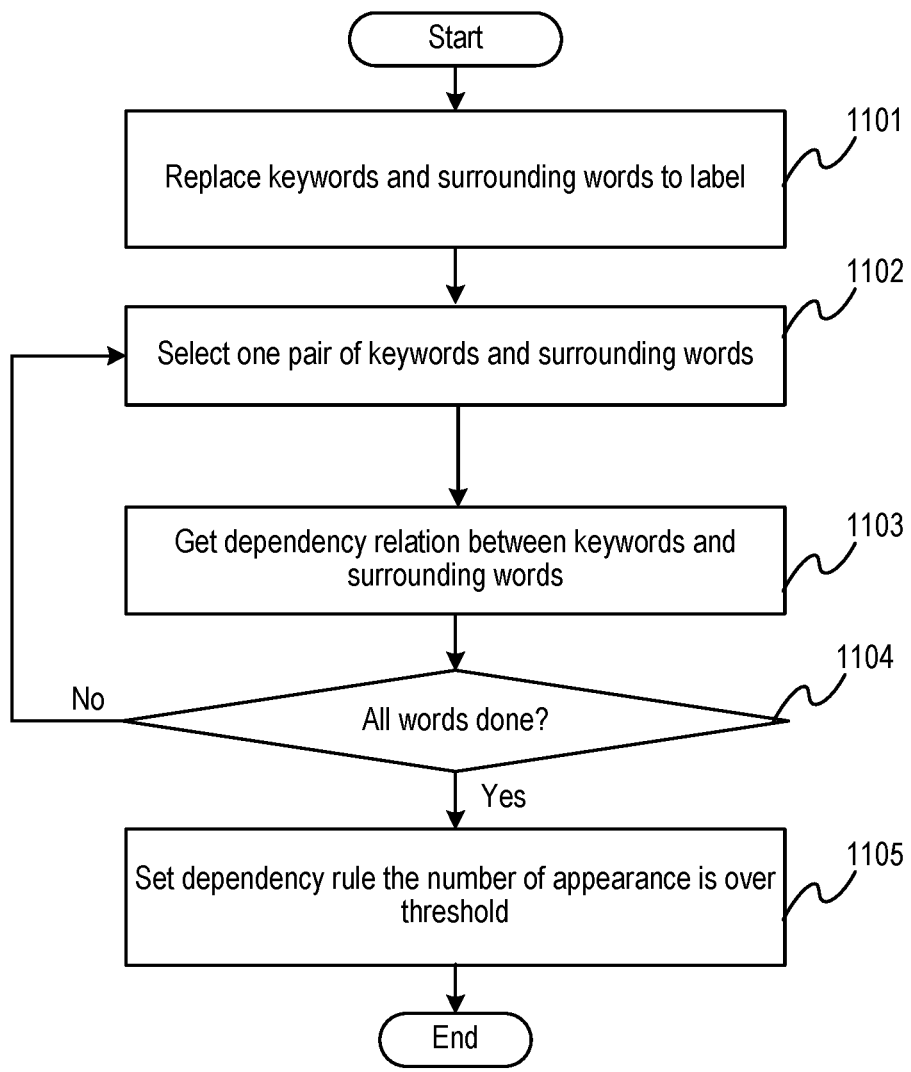
FIG. 17 illustrates an example flow of the dependency rule applier, in accordance with an example implementation.

FIG. 17 illustrates an example flow of the dependency rule applier 1002, in accordance with an example implementation. At 1101, the flow replaces keywords and surrounding words to label each text 101. Labeling information is provided in labeling information 102-6. At 1102, the flow selects one pair of keywords and surrounding words in the text. In this example implementation, the flow determines which words are keywords and which words are surrounding words from correct data 1001.

At 1103, the flow obtains the dependency relation between keywords and surrounding words. Dependency relation can get from dependency information 102-5. In an example, assume dependency relation is "VBS NNK" where VB and NN indicates the POS tags for the words and "S" indicates the word is a surrounding word and "K" indicates the word is a keyword. At 1104, the flow at 1102 and 1103 is reiterated for all pairs of keywords and surrounding words. At 1105, the flow calculates the number of dependency relation extracted at 1103. The flow extracts dependency rules whose number exceeds the threshold.

In another example implementation, the system extract the main sentence from texts. To facilitate such implementations, the system add a label for each sentence, and find the sentence which satisfy the dependency rules for sentence containing the dependency patterns of the label of sentences. In example implementations, the system creates a co-occurrence dictionary for sentences, which include pairs of a label indicating main sentence and labels indicating surrounding sentences.

Figure 18:
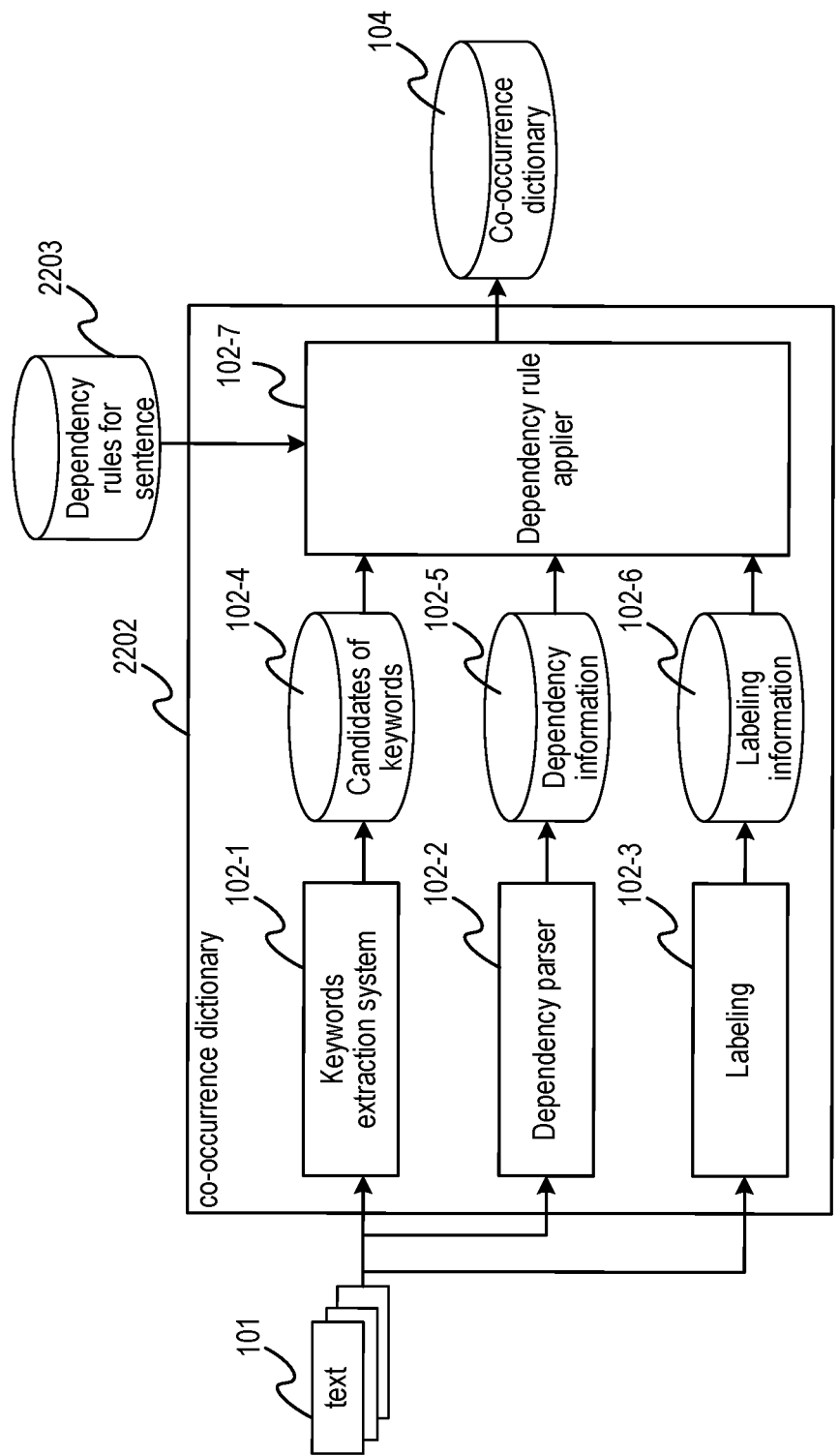
FIG. 18 illustrates an example structure for creating the co-occurrence dictionary, in accordance with an example implementation.

FIG. 18 illustrates an example structure for creating the co-occurrence dictionary 104, in accordance with an example implementation. Specifically, the main sentence extraction 2202-1 creates main sentence candidates. Depending on the desired implementation, tf-idf can be used to extract keywords and select sentences which contain many keywords over a threshold.

Sentence dependency parser 2202-2 extracts sentence dependencies. The sentence dependencies can be used for html tags, or other existing method to extract structure of the text. Sentence labeling 202-3 provide a label for each text. Depending on the desired implementation, labels for keywords for each text can be used.

Dependency rules for sentence 2203 includes dependency rules for a label indicating the main sentence and labels indicating surrounding sentences. Dependency rule applier 102-7 is the same as in FIG. 2. In the example of FIG. 18, the co-occurrence dictionary 104 is created according to the other example implementations described herein. Co-occurrence dictionary includes the pair of a label indicating the main sentence and labels indicating surrounding sentences.

Figure 19:
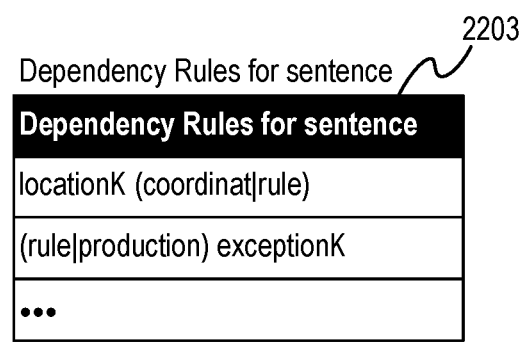
FIG. 19 illustrates an example of dependency rules for sentences, in accordance with an example implementation.

FIG. 19 illustrates an example of dependency rules for sentences 2203, in accordance with an example implementation. In the example of FIG. 19, the rules involve regex patterns of the label. "K" is added for each label which indicates the main sentence. If "K" is not added, it means the label indicates surrounding sentences. This structure is similar in the other example implementations for keywords in that both use label and add "K" after the label when label indicating keywords or main sentences. Thus, the same logic to extract main sentence from texts can be utilized.

Through the example implementations described herein, keywords can be extracted from text in a more accurate manner than the related art, which can satisfy many use cases such as summarizing or correlating text. In particular, the confidence of each keyword can be evaluated through the example implementations described herein, which reduces processing power required to determine keywords as users can set desired confidence levels to reduce the keywords for consideration.

Figure 20:
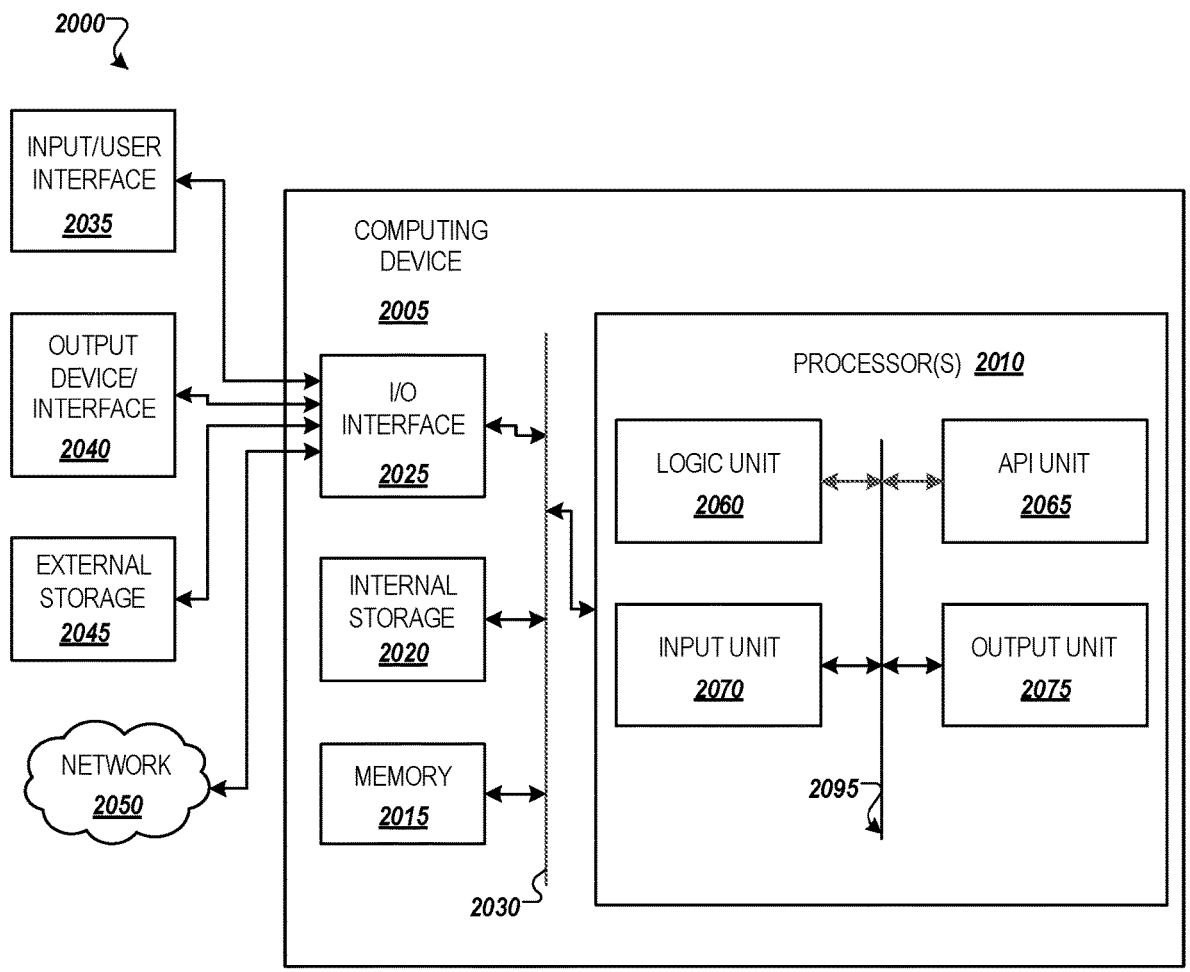
FIG. 20 illustrates an example computing environment with an example computer device suitable for use in some example implementations.

FIG. 20 illustrates an example computing environment with an example computer device suitable for use in some example implementations. Computer device 2005 in computing environment 2000 can include one or more processing units, cores, or processors 2010, memory 2015 (e.g., RAM, ROM, and/or the like), internal storage 2020 (e.g., magnetic, optical, solid state storage, and/or organic), and/or IO interface 2025, any of which can be coupled on a communication mechanism or bus 2030 for communicating information or embedded in the computer device 2005. IO interface 2025 is also configured to receive images from cameras or provide images to projectors or displays, depending on the desired implementation.

Computer device 2005 can be communicatively coupled to input/user interface 2035 and output device/interface 2040. Either one or both of input/user interface 2035 and output device/interface 2040 can be a wired or wireless interface and can be detachable. Input/user interface 2035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 2040 may include a display, television, monitor, printer, speaker, braille, or the like. In some example implementations, input/user interface 2035 and output device/interface 2040 can be embedded with or physically coupled to the computer device 2005. In other example implementations, other computer devices may function as or provide the functions of input/user interface 2035 and output device/interface 2040 for a computer device 2005.

Examples of computer device 2005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 2005 can be communicatively coupled (e.g., via IO interface 2025) to external storage 2045 and network 2050 for communicating with any number of networked components, devices, and systems, including one or more computer devices of the same or different configuration. Computer device 2005 or any connected computer device can be functioning as, providing services of, or referred to as a server, client, thin server, general machine, special-purpose machine, or another label.

IO interface 2025 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 2000. Network 2050 can be any network or combination of networks (e.g., the Internet, local area network, wide area network, a telephonic network, a cellular network, satellite network, and the like).

Computer device 2005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 2005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 2010 can execute under any operating system (OS) (not shown), in a native or virtual environment. One or more applications can be deployed that include logic unit 2060, application programming interface (API) unit 2065, input unit 2070, output unit 2075, and inter-unit communication mechanism 2095 for the different units to communicate with each other, with the OS, and with other applications (not shown). The described units and elements can be varied in design, function, configuration, or implementation and are not limited to the descriptions provided. Processor(s) 2010 can be in the form of hardware processors such as central processing units (CPUs) or in a combination of hardware and software units.

In some example implementations, when information or an execution instruction is received by API unit 2065, it may be communicated to one or more other units (e.g., logic unit 2060, input unit 2070, output unit 2075). In some instances, logic unit 2060 may be configured to control the information flow among the units and direct the services provided by API unit 2065, input unit 2070, output unit 2075, in some example implementations described above. For example, the flow of one or more processes or implementations may be controlled by logic unit 2060 alone or in conjunction with API unit 2065. The input unit 2070 may be configured to obtain input for the calculations described in the example implementations, and the output unit 2075 may be configured to provide output based on the calculations described in example implementations.

Processor(s) 2010 can be configured to extract keywords and dependency information from a text; and generate a co-occurrence dictionary for the text, the generating the co-occurrence dictionary involving selecting ones of the keywords for inclusion in the co-occurrence dictionary based on a number of times the ones of the keywords satisfy the dependency rules; determining for the selected ones of the keywords included in the co-occurrence dictionary, surrounding words to be associated with the selected ones of the keywords in the co-occurrence dictionary based on a number of instances of co-occurrence of the surrounding words with the selected ones of the keywords; and generating weights for each of the selected ones of the keywords in the co-occurrence dictionary based on a number of the surrounding words associated with the selected ones of the keywords as illustrated in FIG. 11.

Processor(s) 2010 is configured to apply labels on each word of text, wherein the dependency rules comprises regex patterns of labels indicative of keywords to be included in the co-occurrence dictionary, wherein co-occurrence of the surrounding words is determined based on the applied labels as illustrated in FIGS. 11 and 19. Depending on the desired implementation, the labels can involve part of speech labels.

Depending on the desired implementation, the dependency rules involve identifying extracted keywords that are a noun preceded by a noun, an adjective preceded by an adjective, or an adverb preceded by a verb as the ones of keywords to be selected for inclusion; wherein the processor(s) 2010 can be configured to select ones of the keywords for inclusion in the co-occurrence dictionary based on the number of times the ones of the keywords satisfy the dependency rules by incrementing a first counter for when the dependency rules are satisfied; incrementing a second counter for when the dependency rules are not satisfied; and selecting the ones of the keywords for inclusion for when the first counter exceeds the second counter as illustrated at FIGS. 11-15.

Depending on the desired implementation, processor(s) 2010 can be configured to determine for the selected ones of the keywords included in the co-occurrence dictionary, the surrounding words to be associated with the selected ones of the keywords in the co-occurrence dictionary based on the number of instances of co-occurrence of the surrounding words with the selected ones of the keywords by: for an extracted keyword being preceded by another extracted keyword, determining the another extracted keyword as being an instance of co-occurrence of the extracted keyword and incrementing a counter; and for the counter exceeding a threshold, determining the another extracted keyword as one of the surrounding words as illustrated at FIGS. 11-15.

The apparatus of claim 13, wherein the processor is configured to generate confidence scores for each of the selected ones of the keywords based on the weights and correlation between each of the selected ones of the keywords as illustrated at FIGS. 12-15.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   extracting, by a processor, keywords and dependency information from a text; and
   generating, by the processor, a co-occurrence dictionary for the text, the generating the co-occurrence dictionary comprising:
   selecting, by the processor, ones of the keywords for inclusion in the co-occurrence dictionary based on a number of times the ones of the keywords satisfy the dependency rules and user defined confidence levels;
   determining, by the processor, for the selected ones of the keywords included in the co-occurrence dictionary, surrounding words to be associated with the selected ones of the keywords in the co-occurrence dictionary based on a number of instances of co-occurrence of the surrounding words with the selected ones of the keywords;
   generating, by the processor, weights for each of the selected ones of the keywords in the co-occurrence dictionary based on a number of the surrounding words associated with the selected ones of the keywords; and
   generating, by the processor, confidences scores for each of the selected ones of the keywords based on the weights and correlation between each of the selected ones of the keywords,
   wherein application of the user defined confidence levels in the keyword selection reduces processing power required in the generation of confidence scores by removing keywords for consideration, and
   wherein the dependency rules comprise identifying extracted keywords that are a noun preceded by a noun, and adjective preceded by an adjective, or an adverb preceded by a verb as the one of keywords to be selected for inclusion; wherein the selecting ones of the keywords for inclusion in the co-occurrence dictionary based on the number of times the ones of the keywords satisfy the dependency rules comprises:
   incrementing a first counter for when the dependency rules are satisfied;
   incrementing a second counter for when the dependency rules are not satisfied; and
   selecting the ones of the keywords for inclusion for when the first counter exceeds the second counter.

2. The method of claim 1, further comprising applying labels on each word of text, wherein the dependency rules further comprises regex patterns of labels indicative of keywords to be included in the co-occurrence dictionary, wherein co-occurrence of the surrounding words is determined based on the applied labels.

3. The method of claim 2, wherein the labels comprise part of speech labels.

4. The method of claim 1, wherein the determining for the selected ones of the keywords included in the co-occurrence dictionary, the surrounding words to be associated with the selected ones of the keywords in the co-occurrence dictionary based on the number of instances of co-occurrence of the surrounding words with the selected ones of the keywords comprises:
   for an extracted keyword being preceded by another extracted keyword, determining the another extracted keyword as being an instance of co-occurrence of the extracted keyword and incrementing a counter; and
   for the counter exceeding a threshold, determining the another extracted keyword as one of the surrounding words.

5. A non-transitory computer readable medium, storing instructions for executing a process, the instructions comprising:
   extracting, by a processor, keywords and dependency information from a text; and
   generating, by the processor, a co-occurrence dictionary for the text, the generating the co-occurrence dictionary comprising:
   selecting, by the processor, ones of the keywords for inclusion in the co-occurrence dictionary based on a number of times the ones of the keywords satisfy the dependency rules and user defined confidence levels;
   determining, by the processor, for the selected ones of the keywords included in the co-occurrence dictionary, surrounding words to be associated with the selected ones of the keywords in the co-occurrence dictionary based on a number of instances of co-occurrence of the surrounding words with the selected ones of the keywords;
   generating, by the processor, weights for each of the selected ones of the keywords in the co-occurrence dictionary based on a number of the surrounding words associated with the selected ones of the keywords; and generating, by the processor, confidence scores for each of the selected ones of the keywords based on the weights and correlation between each of the selected ones of the keywords, wherein application of the user defined confidence levels in the keyword selection reduces processing power required in the generation of confidence scores by removing keywords for consideration, and wherein the dependency rules comprise identifying extracted keywords that are a noun preceded by a noun, an adjective preceded by an adjective, or an adverb preceded by a verb as the ones of keywords to be selected for inclusion, wherein the selecting ones of the keywords for inclusion in the co-occurrence dictionary based on the number of times the ones of the keywords satisfy the dependency rules comprises:

incrementing a first counter for when the dependency rules are satisfied;

incrementing a second counter for when the dependency rules are not satisfied; and selecting the ones of the keywords for inclusion for when the first counter exceeds the second counter.

6. The non-transitory computer readable medium of claim 5, the instructions further comprising applying labels on each word of text, wherein the dependency rules further comprises regex patterns of labels indicative of keywords to be included in the co-occurrence dictionary, wherein co-occurrence of the surrounding words is determined based on the applied labels.

7. The non-transitory computer readable medium of claim 6, wherein the labels comprise part of speech labels.

8. The non-transitory computer readable medium of claim 5, wherein the determining for the selected ones of the keywords included in the co-occurrence dictionary, the surrounding words to be associated with the selected ones of the keywords in the co-occurrence dictionary based on the number of instances of co-occurrence of the surrounding words with the selected ones of the keywords comprises:

for an extracted keyword being preceded by another extracted keyword, determining the another extracted keyword as being an instance of co-occurrence of the extracted keyword and incrementing a counter; and for the counter exceeding a threshold, determining the another extracted keyword as one of the surrounding words.

9. An apparatus, comprising:

a processor, configured to:

extract keywords and dependency information from a text; and generate a co-occurrence dictionary for the text by:

selecting ones of the keywords for inclusion in the co-occurrence dictionary based on a number of times the ones of the keywords satisfy the dependency rules and user defined confidence levels;

determining for the selected ones of the keywords included in the co-occurrence dictionary, surrounding words to be associated with the selected ones of the keywords in the co-occurrence dictionary based on a number of instances of co-occurrence of the surrounding words with the selected ones of the keywords;

generating weights for each of the selected ones of the keywords in the co-occurrence dictionary based on a number of the surrounding words associated with the selected ones of the keywords; and generating, by the processor, confidence scores for each of the selected ones of the keywords based on the weights and correlation between each of the selected ones of the keywords, wherein application of the user defined confidence levels in the keyword selection reduces processing power required in the generation of confidence scores by removing keywords for consideration, and wherein the dependency rules comprise identifying extracted keywords that are a noun preceded by a noun, an adjective preceded by an adjective, or an adverb preceded by a verb as the ones of keywords to be selected for inclusion; wherein the processor is configured to select ones of the keywords for inclusion in the co-occurrence dictionary based on the number of times the ones of the keywords satisfy the dependency rules by:

incrementing a first counter for when the dependency rules are satisfied;

incrementing a second counter for when the dependency rules are not satisfied; and selecting the ones of the keywords for inclusion for when the first counter exceeds the second counter.

10. The apparatus of claim 9, wherein the processor is configured to apply labels on each word of text, wherein the dependency rules further comprises regex patterns of labels indicative of keywords to be included in the co-occurrence dictionary, wherein co-occurrence of the surrounding words is determined based on the applied labels.

11. The apparatus of claim 10, wherein the labels comprise part of speech labels.

12. The apparatus of claim 9, wherein the processor is configured to determine for the selected ones of the keywords included in the co-occurrence dictionary, the surrounding words to be associated with the selected ones of the keywords in the co-occurrence dictionary based on the number of instances of co-occurrence of the surrounding words with the selected ones of the keywords by:

for an extracted keyword being preceded by another extracted keyword, determining the another extracted keyword as being an instance of co-occurrence of the extracted keyword and incrementing a counter; and for the counter exceeding a threshold, determining the another extracted keyword as one of the surrounding words.

\* \* \* \* \*